June 24, 1930.  F. J. HINDERLITER  1,767,286
FRICTION SUB
Filed Oct. 19, 1927
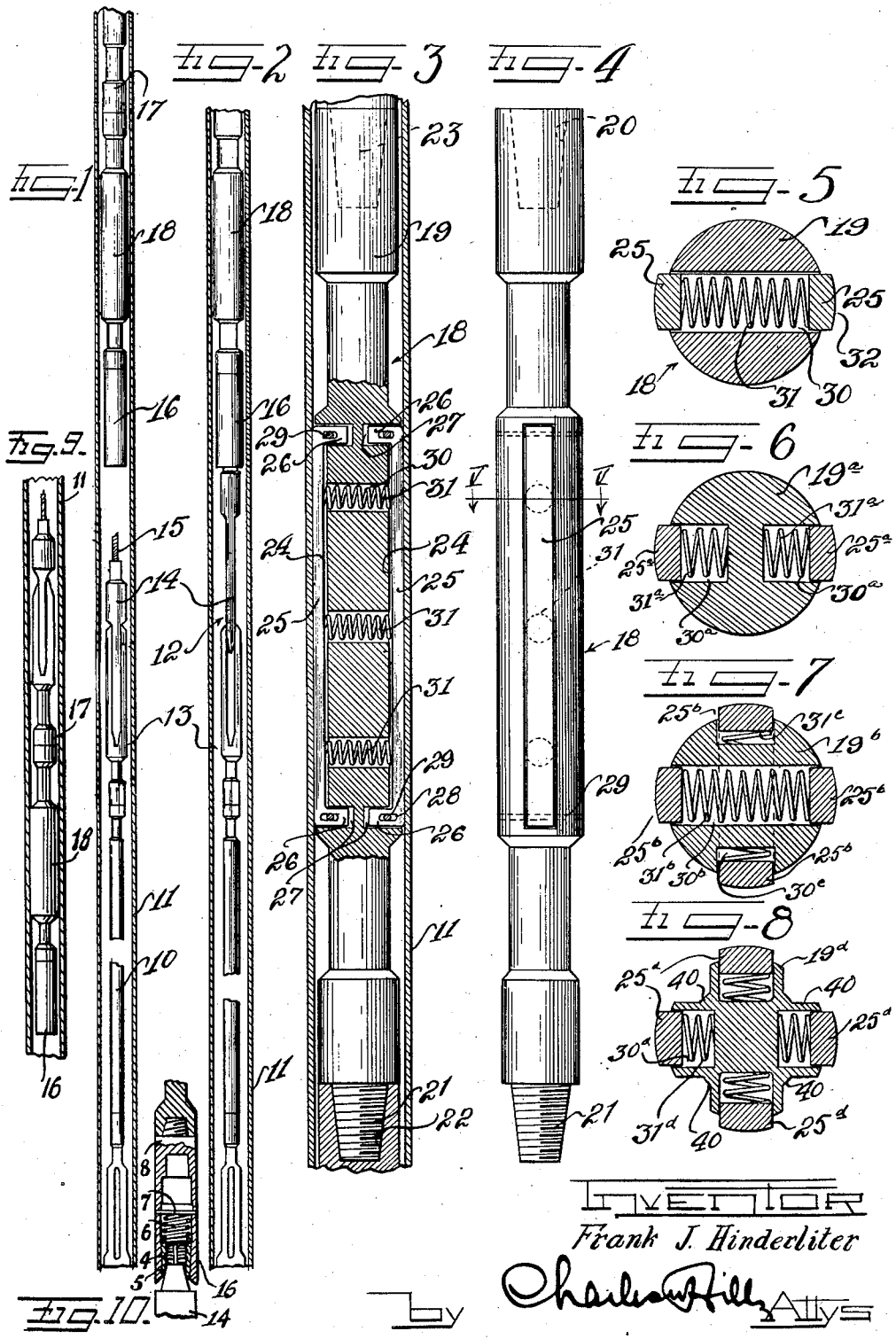

Patented June 24, 1930

1,767,286

UNITED STATES PATENT OFFICE

FRANK J. HINDERLITER, OF TULSA, OKLAHOMA

FRICTION SUB

Application filed October 19, 1927. Serial No. 227,195.

The present invention relates in general to fishing apparatus for use in connection with the drilling of wells, and more particularly to a tool which I term a friction sub adapted to be used in a well to keep the drilling jar from working when the drilling tool is being jarred loose in the well by means of a fishing jar.

In the drilling of oil wells, the drilling cable quite frequently breaks above the drilling jar associated with the drilling tool, and it is necessary to fish the tool from the bottom of the well. Quite frequently this tool becomes wedged or stuck in the well and cannot satisfactorily be removed by the standard fishing apparatus. The drilling jar is not of a sufficient size to jar loose the tool and hence it is necessary to employ a larger jar termed a fishing jar.

Now heretofore the fishing jar was connected directly to the drilling jar by means of a socket. This meant that the action of the fishing jar was to a considerable extent nullified by the action of the drilling jar, which was free to be extended under the action of the former jar. Moreover, during this action, the slips of the combination socket were easily broken.

I propose to meet the above difficulties by providing a device adapted to be interposed between the drilling and fishing jars to cause the drilling jar to be held in its extended position and to prevent it from operating under the action of the fishing jar. That is to say, the action of the drilling jar is nullified so as to enable the full jarring action of the fishing jar to be applied to the drilling tool wedged in the bottom of the well.

An object of my invention resides in the provision of a friction tool adapted for use in a well to hold apparatus suspended therefrom in a given position relative to the well.

Another object of the present invention is to provide a friction tool adapted to engage the inner surface of a well casing and to hold the drilling jar in an extended position, whereby each time the fishing jar is caused to operate, the jarring action of the fishing jar will not be affected by the drilling jar.

A further object of my invention is the provision of a friction device adapted to be interposed between a drilling jar and a fishing jar for the purpose of holding the drilling jar in its extended position and for the purpose of holding the drilling tool in the position to which it is jarred after each operation of the fishing jar.

In accordance with the general features of the present invention I provide a friction tool for use in connection with the drilling of a well comprising a body portion having loosely mounted on its sides a plurality of diametrically opposed plates which are at all times resiliently urged outwardly by means of springs interposed between the plates and mounted in the body portion, the plates being adapted to frictionally engage the inner surface of the well casing.

Other objects and advantages of my present invention will more fully appear from the following detailed description taken in connection with the accompanying drawing, which illustrates several embodiments thereof and in which:

Figure 1 is a fragmentary vertical view showing a drilling jar in the bottom of a well casing about to be engaged by the fishing aparatus including the friction sub of my invention, the well casing being shown in section;

Figure 2 is a view similar to Figure 1 showing the drilling jar engaged by the socket of the fishing apparatus, the drilling jar being illustrated in its extended position;

Figure 3 is an enlarged fragmentary view showing the device of my invention frictionally engaging the inner surface of the well casing, the device being partly in section in order to illustrate the details of the construction thereof;

Figure 4 is an elevation of my device showing clearly the position of one of the friction plates relative to the device;

Figure 5 is a cross-sectional view taken on substantially the line V—V of Figure 4 looking downwardly;

Figure 6 is a cross-sectional view similar to Figure 5 of a modified form of my device;

Figure 7 is a cross-sectional view similar to Figure 5 through a third form of my device;

Figure 8 is a cross-sectional view similar to Figure 5 through still another form of my invention;

Figure 9 is a fragmentary view similar to Figure 1 illustrating the construction of the fishing jar, and Figure 10 is a fragmentary sectional view drawn to an enlarged scale of the combination socket.

In the drawings:

Like reference characters designate similar parts throughout the several views.

The reference character 10 designates generally a drilling tool which is stuck in the bottom of a well defined by a casing 11. Connected to the top of the drilling member 10 is a drilling jar 12 including a pair of relatively slidable members 13 and 14 which are of conventional construction. Secured to the jar member 14 is a cable 15 which is broken, as indicated in Figure 1.

Cooperable with the jar member 14 is a combination socket 16 which is shown as being of a similar construction to that of the socket shown in my prior patent No. 1,545,830, issued July 14, 1925, and includes slips or other gripping means 4 (Figure 10) adapted to frictionally engage the upper jar member 14, as shown in Figure 2, whereby the upper jar member may be drawn to its extended position. The wedges or slips 4 are at all times urged into engagement with an annular slanting surface 5 by means of a spring 6 held in place by a transverse pin 7; all of said parts being connected to the socket tube 8. The slips 4 are designed to be wedged into engagement with the boss on the upper end of the jar member 14 (Figures 2 and 10).

Heretofore it has been the practice to connect the combination socket directly to the fishing jar, which is designated generally by the reference character 17 in Figure 1. As pointed out previously, this was undesirable for the reason that the drilling jar was free to operate and hence the action of the fishing jar was more or less frustrated. In accordance with the features of my invention, I have eliminated this objectionable feature by interposing a friction device which I term a sub combination, designated generally by the reference character 18, between the fishing jar 17 and the combination socket 16.

This device 18 comprises a rod member 19 having a threaded socket 20 at its upper end and a threaded portion 21 at its lower end. The threaded portion 21 is adapted to be screwed into a threaded opening 22 (Figure 3) in the upper end of the combination socket 16. The threaded socket or opening 22 is adapted to receive a threaded portion 23 formed integral with the lower fishing jar member.

An intermediate portion of the rod 19 has formed in it a pair of diametrically opposed vertical slots or grooves 24—24 adapted to receive friction plates 25—25. Formed integral with each end of each of the plates 25 is a lateral extension 26 which extends into an opening 27 in the enlarged intermediate portion of the rod 19. This lateral extension 26 has an elongated slot 28 into which extends a pin 29 secured to the rod 19. This arrangement is such that each plate is permitted to have a limited degree of lateral movement relative to the rod.

Positioned between the friction plates 25 are three openings 30, in each of which is disposed a spring 31, the ends of which abut the two plates 25—25. These three springs function to at all times urge the plates outwardly and away from each other. In other words, when the device 18 is in the well casing, the plates will be urged into tight frictional engagement with the inner surface of the well casing 11. Attention is directed to the fact that the outer surface of each of these plates is preferably formed curved, as indicated at 32, so as to enable the plates to readily adjust themselves and to better grip the inner surface of the well casing.

The operation of my novel construction is briefly as follows:

The combination socket 16, the friction sub 18 and the fishing jar 17 are initially connected together, whereby they may be lowered into the well as a unit. This unit is forced downwardly into the well until the socket 16 engages and grips the upper jar member 14 of the drilling jar 12. Thereafter the unit is drawn upwardly in the well casing 11, whereby the jar member 14 is moved to its extended position shown in Figure 2. When the unit is in the position shown in Figure 2, it is ready for the next operation, namely the operation of the fishing jar 17. Obviously, the frictional plates 25 of my novel friction sub 18 will engage the inner surface of the casing 18 and will serve to hold the jar member 14 in the aforesaid extended position.

Thereafter power is applied to the fishing jar 17, whereby it is set into motion to jar loose the drilling tool 10 which has become stuck or imbedded in the bottom of the well. It will, of course, be apparent to those skilled in the present art that the fishing jar is of a considerably greater size than that of the drilling jar 12. Hence, it is desirable that the fishing jar be operated without any interference on the part of the drilling jar. This feature is accomplished through the sub combination which by holding the jar member 14 in its extended position prevents the operation of this drilling jar.

Now in order to work the drilling tool 10 loose from the bottom of the well, it is necessary that a jarring action be applied to it, rather than a pulling action. The action of the drilling jar 12 is not great enough usually to work loose this tool. Moreover, it is not feasible to apply a very great force to the drilling jar due to the fact that if too great a force is applied thereto, it will result in the breakage of the combination socket 16. Hence, it is essential that means be supplied for applying a relatively great jarring action to the tool. This means takes the form of the previously described fishing jar 17. Due to the position of the friction sub 18 relative to the socket 16 and the fishing jar 17, it will necessarily follow that this socket will not be subjected to as great a pulling strain as formerly, and hence its longevity is greatly augmented. The sub 18, however, is of such a construction that it permits of the jarring action of the jar 17 being applied, without interference on the part of the drilling jar, directly to the tool 10. Then, too, it is to be noted that if the tool 10 is worked loose a slight degree, whereby it is possible to draw it upwardly a short distance, the friction sub 18 will hold it in the position to which it is pulled so that it will not gravitate back into its former position. In other words, as the tool is progressively worked upwardly in the casing 11, the friction sub 18 functions to hold it in its various progressive positions, thus expediting and facilitating the fishing operation.

In Figure 6 I have illustrated one modification of my invention, wherein each friction plate 25$^a$ is provided with an independent set of springs 31$^a$ disposed in independent holes 30$^a$. That is to say, the device will be provided with six springs 31$^a$ instead of the three shown in Figure 3, there being three springs for each friction plate. The holes 30$^a$ for accommodating each set of three springs 31$^a$ are independent of the holes for accommodating the other set of springs 31$^a$.

In Figure 7 I have illustrated a second modification of the invention, wherein the intermediate portion of the rod 19$^b$ of the friction sub is provided with four friction plates 25$^b$ disposed 90° apart. One set of plates 25$^b$ are disposed diametrically opposite each other and are urged outwardly by springs 31$^b$ disposed in slots 30$^b$. The other set of plates 25$^b$ are disposed diametrically opposite each other and at right angles to the first set of plates. This latter set of plates 25$^b$ are urged outwardly by springs 31$^c$ disposed in openings 30$^c$. The springs 31$^c$ are staggered relative to the springs 31$^b$, as is evident from Figure 7. This form of the invention is especially desirable when a friction sub is required with a greater frictional area.

In Figure 8 I have illustrated a third modification of my friction sub which is especially adapted for use in connection with a wire line outfit for cutting wire cables in a deep well. This friction sub is adapted to be placed between the knife and jar and functions to hold the knife up, whereby the cutter is allowed to cut the wire cable at any given place in the well hole. Moreover, this sub always acts as a guide to keep the wire line cutting outfit, which is usually run on a wire sand line, from wrapping around the drilling cable that is being cut. Obviously if the cutting outfit is allowed to wrap around the drilling cable which is to be cut, it is not possible to get the jar to operate, thus resulting in the loss of the stroke of the jar.

The intermediate portion of the rod 19$^b$ is provided with four frictional plates 25$^d$ arranged 95° apart. Each of these plates is urged outwardly by a plurality of springs 31$^d$ disposed in slots 30$^d$. Attention is directed to the fact that the intermediate portion of the rod 19$^d$ is provided with four cut out portions 40. Each of these cut out portions 40 is disposed intermediate a pair of adjacent plates 25$^d$ and is adapted to accommodate the drilling line which is to be cut, when this friction sub is in use in connection with a wire line outfit.

Since the operation of each of the three modified forms of friction sub shown in Figures 6, 7 and 8 is substantially like that of the preferred form, it is thought that no further description of these modifications of the invention need be given.

Now I desire it understood that although I have illustrated and described in detail the preferred forms of my invention, the invention is not to be thus limited, but only in so far as defined by the scope and spirit of the appended claims.

I claim as my invention:

1. In combination, a jar adapted to be lowered into a well casing, a frictional device disposed between the jar and the lower part of the well adapted to frictionally embrace the inner surface of the wall of the casing, and work performing mechanism associated with the lower end of said device arranged to be acted upon by said jar through said device, said device serving to hold up said mechanism in the well casing during the down or return stroke of the jar.

2. In combination, a jar adapted to be lowered into a well casing, a frictional device disposed between the jar and the lower part of the well adapted to frictionally embrace the inner surface of the wall of the casing, and work performing mechanism associated with the lower end of said device arranged to be acted upon by said jar through said device, said device serving to hold up said mechanism in the well casing during the down or return stroke of the jar and including a plurality of outwardly urged plates designed to embrace the well casing.

3. In combination, a jar adapted to be lowered into a well casing, a frictional device disposed between the jar and the lower part of the well to frictionally embrace the inner surface of the wall of the casing, and work performing mechanism associated with the lower end of said device arranged to be acted upon by said jar through said device, said device being adapted to hold said mechanism in a given position relative to the well casing and including a plurality of plates outwardly urged by resilient means into cooperation with the inner surface of the casing, each of said plates being shaped to conform with said inner surface of the casing.

4. In combination, a jar adapted to be lowered into a well casing, a frictional device disposed between the jar and the lower part of the well to frictionally embrace the inner surface of the wall of the casing, and work performing mechanism associated with the lower end of said device arranged to be acted upon by said jar through said device, said device holding said mechanism in a given position relative to the well casing and including friction plates urged outwardly at all times in different directions, each of said plates being capable of a limited degree of lateral movement to tightly embrace the inner surface of the well casing.

5. In combination, a jar adapted to be lowered into a well casing, a frictional device disposed between the jar and the lower part of the well to frictionally embrace the inner surface of the wall of the casing, and work performing mechanism associated with the lower end of said device arranged to be acted upon by said jar through said device, said device serving to hold said mechanism in a given position relative to the well casing and including a rod having an intermediate portion provided with a plurality of laterally movable friction plates and a plurality of springs mounted in said intermediate portion to urge said plates outwardly into cooperation with the inner surface of the well casing.

6. In combination, a jar adapted to be lowered into a well casing, a frictional device disposed between the jar and the lower part of the well to frictionally embrace the inner surface of the wall of the casing, and work performing mechanism associated with the lower end of said device arranged to be acted upon by said jar through said device, said device holding said mechanism in a given position relative to the well casing and including a body member having mounted therein a plurality of outwardly urged friction plates, each of said plates including lateral extensions slidably mounted in said body portion.

7. In combination, a jar adapted to be lowered into a well casing, a frictional device disposed between the jar and the lower part of the well to frictionally embrace the inner surface of the wall of the casing, and work performing mechanism associated with the lower end of said device arranged to be acted upon by said jar through said device, said device holding said mechanism in a given position relative to the well casing and including a body member having an intermediate portion thereof provided with slots for accommodating friction plates and springs disposed between said plates mounted in said intermediate portion for urging said plates outwardly, each of said plates including lateral extensions slidably mounted in said intermediate portion of the body.

8. In combination, in a fishing tool adapted to remove a drilling jar and tool from a well casing comprising a fishing jar, a device suspended from the fishing jar to embrace the inner surface of the well casing, and a socket suspended from said device to grip the upper member of said drilling jar, whereby said upper member may be pulled to its extended position, said friction device being designated to hold said member in its extended position so that the fishing jar may be operated without interference on the part of the drilling jar.

9. The method of removing a drilling jar and tool from the bottom of a well, which consists in moving the upper jar member to its extended position, frictionally anchoring said upper jar member to the well casing, and applying the force of the fishing jar to said drilling jar member in its extended position.

10. The method of removing a drilling jar and tool from a well, which consists in pulling the drilling jar to its extended position, holding said drilling jar in its extended position by anchoring it to the well casing, and applying a jarring action to said drilling jar while it is in its extended position.

11. The method of removing a drilling jar and tool from the bottom of a well, which consists in causing the drilling jar to be put in its extended position, holding said jar in its extended position to render it ineffective as a jarring medium, and applying a jar action to the upper end of said jar while it is in its extended position to loosen said tool in the well.

12. The method of removing a tool from a well, which consists in gripping the tool, applying the action of a jar to the tool to pull it upwardly, and holding said tool up in the well during the return stroke of the jar by frictionally anchoring the tool to the well casing so that the tool is prevented from gravitating in the well casing.

In testimony whereof I have hereunto subscribed my name at Tulsa, Oklahoma, county of Tulsa.

FRANK J. HINDERLITER.